H. W. MORROW.
SHEAF CARRIER.
APPLICATION FILED NOV. 4, 1919.

1,331,352.

Patented Feb. 17, 1920.
3 SHEETS—SHEET 1.

Witnesses
Edwin F. McKee

Inventor
Herbert W. Morrow
By Victor J. Evans
Attorney

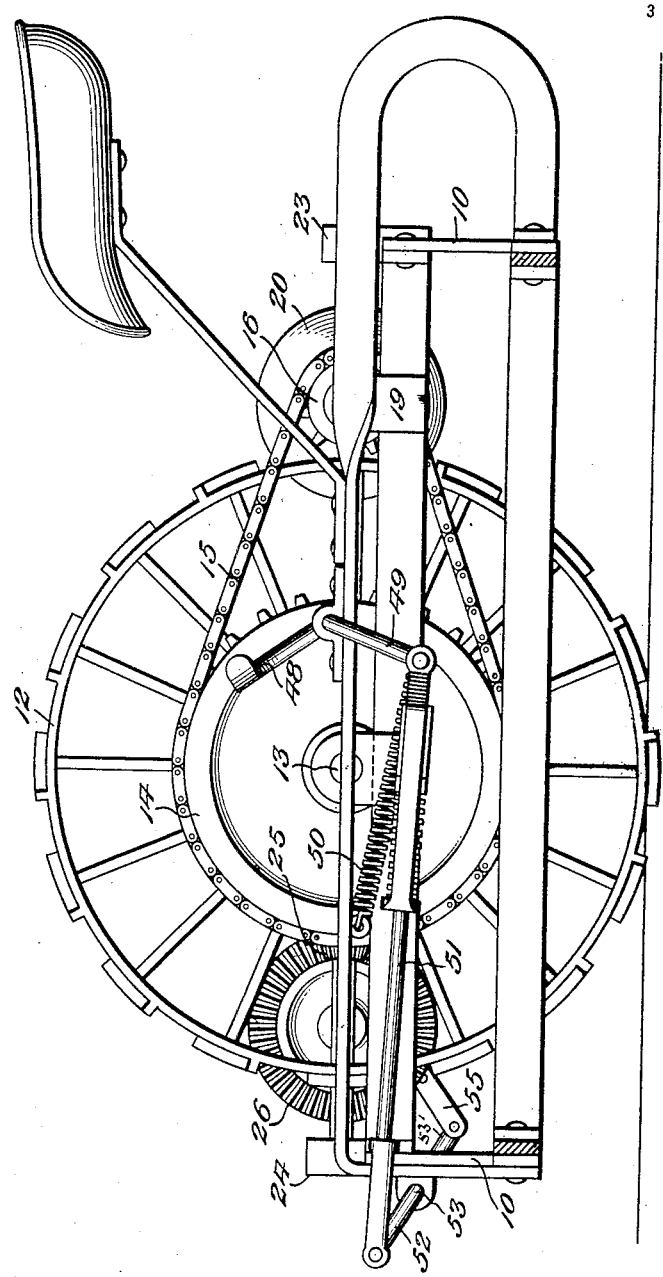

H. W. MORROW.
SHEAF CARRIER.
APPLICATION FILED NOV. 4, 1918.
1,331,352.
Patented Feb. 17, 1920.
3 SHEETS—SHEET 3.
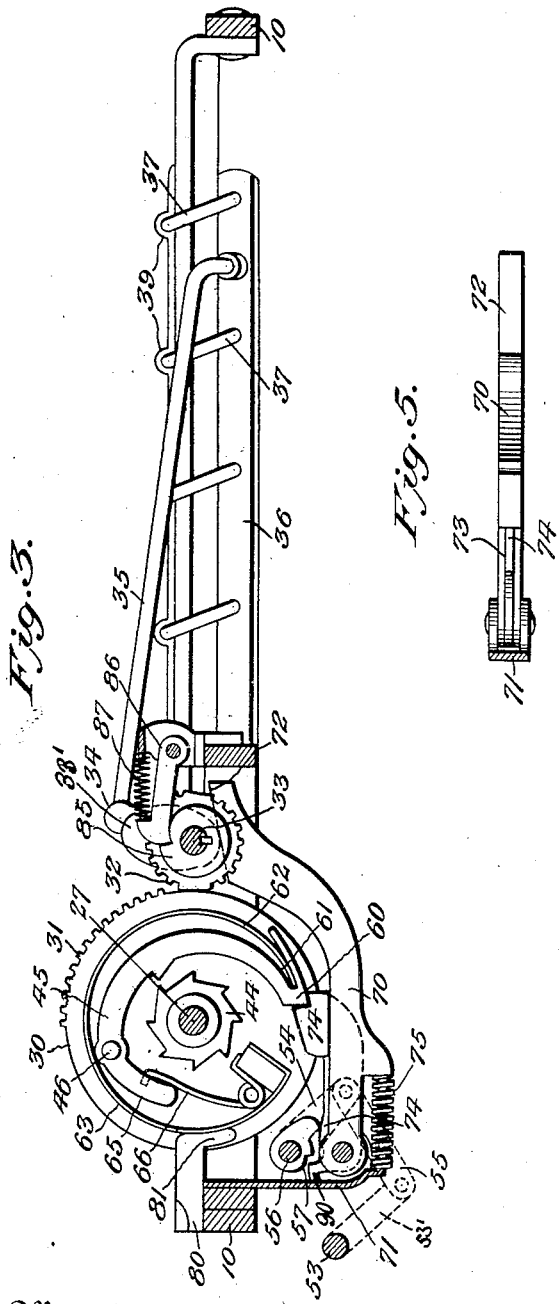
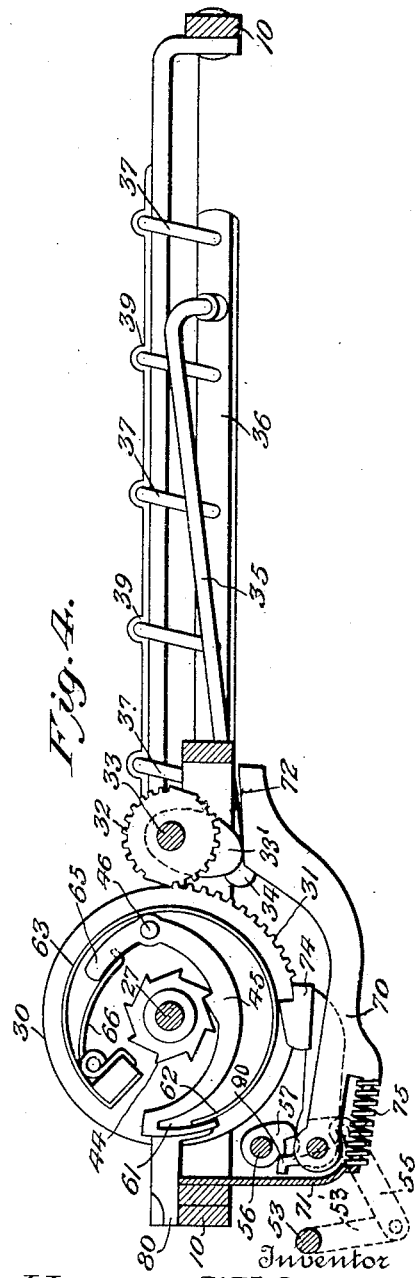
Witnesses
Edwin F. McKee
Inventor
Herbert W. Morrow
By Victor J. Evans
Attorney

UNITED STATES PATENT OFFICE.

HERBERT W. MORROW, OF LOYSVILLE, PENNSYLVANIA.

SHEAF-CARRIER.

1,331,352.   Specification of Letters Patent.   Patented Feb. 17, 1920.

Application filed November 4, 1918. Serial No. 261,018.

*To all whom it may concern:*

Be it known that I, HERBERT W. MORROW, a citizen of the United States, residing at Loysville, in the county of Perry and State of Pennsylvania, have invented new and useful Improvements in Sheaf-Carriers, of which the following is a specification.

This invention relates to a sheaf carrier and one of the objects is to provide means, under the control of the operator of the machine, whereby mechanism is operated for throwing the several elements of the carrier into position for discharging the sheaf, the continued operation of this mechanism, incident to the main drive, serving to to restore the elements of the sheaf carrier, and said carrier as a whole, to position for receiving additional material.

A further object is to provide a sheaf carrier, including a plurality of individual elements, each carrying a crank arm, with means for controlling all of the crank arms simultaneously, said means being actuated upon the rotation of an element, which in turn is rotated when a gear wheel, having teeth on a given portion of its circumference, engages said rotating element, the gear wheel being under the control of mechanism governed by the operation of a pedal within reach of the operator of the machine.

With the foregoing and other objects in view, the invention consists in the novel construction, combination and arrangement of elements hereinafter described and claimed.

Fig. 2 is a section, on an enlarged scale, taken in the plane indicated by the line 2—2 of Fig. 1.

Figs. 3 and 4 are enlarged detail sections, taken in a plane parallel to the line 2—2 of Fig. 1 and showing the mechanism by which operation of the sheaf carrier is controlled.

Fig. 5 is a detail plan of the lever and pawl therein.

Figure 1:
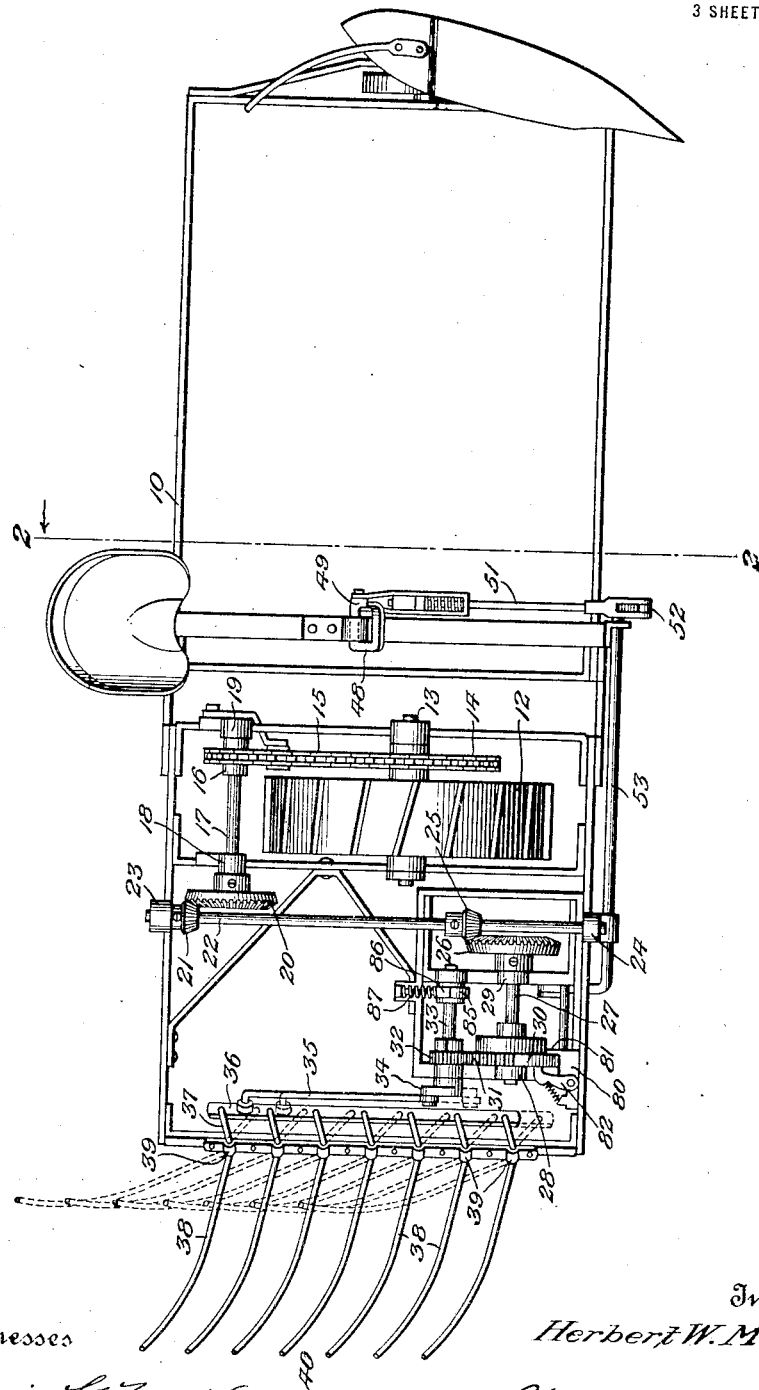
Figure 1 is a plan view of the sheaf carrier constituting the best practical embodiment of my invention that I have as yet devised.

The main frame is designated 10 and one of the ground wheels is shown at 12, this wheel being mounted on an axle 13, carrying a sprocket wheel 14, driving a chain 15, which in turn drives a smaller sprocket wheel 16 on shaft 17 in bearings 18 and 19. Shaft 17 carries a gear wheel 20 driving a pinion 21 on shaft 22, journaled in bearings 23 and 24 in the frame.

Shaft 22 carries a pinion 25 meshing with the gear wheel 26 on a short shaft 27, mounted in bearings 28 and 29.

Loosely mounted on shaft 27 is a gear wheel 30 having teeth 31 extending part way around the circumference thereof, these teeth meshing with a pinion 32 rigidly mounted on shaft 33, the latter carrying a crank 34 connected with a pitman 35 controlling and operating the reciprocating bar 36. Bar 36 is pivotally connected with the crank portions 37 of the individual arms 38 of the sheaf carrier, which, as a whole, is shown at 40 in Fig. 1. These arms 38 are partly rotatable in bearings 39 and are curved as shown.

A ratchet wheel 44 Fig. 3 is carried by shaft 27 and rotates therewith, said wheel being engaged at times by a pawl 45 of yoke shape and pivotally mounted at 46 on one side of the wheel 30. This pawl 45 is held out of engagement with the ratchet wheel and permits the shaft to rotate freely with reference to wheel 30 under normal conditions, the ratchet wheel and the shaft on which it is mounted being driven continuously by the mechanism above described.

At 48, Figs. 1 and 2, is a pedal to which is fixed a crank arm 49 that is yieldingly retained in and returned to the position shown in Fig. 2 by a retractile spring 50, interposed between it and the frame 10. The retractile spring 50 is arranged under one of the longitudinal bars of the frame and is connected at its rear end to the crank arm 49, and at its forward end to the underside of the frame bar, Fig. 2. At 51 is a reciprocatory rod, and at 57, Figs. 3 and 4, is a cam element, fixed on a shaft 56. The said rod 51 is pivotally connected to a crank 52 on a rock shaft 53, and the said shaft 53 is provided with another crank 53', Figs. 2 and 3, that is pivotally connected to a link 55. This link 55 is pivotally connected to a crank 54 on the said shaft 56, and hence it will be apparent that depression of the pedal 48 and rearward movement of the rod 51 will be attended by movement of the cam element 57 into the position shown in Fig. 4.

The end of the pawl 45 constitutes a stop 60, this stop being slotted in the manner shown at 61, and the stop engaging one end portion 62 of a guiding element in the form of a band 63. The opposite end 65 of the pawl is engaged by a spring 66 normally holding the pawl in inactive position, but upon engagement of the stop 60, by means described below, the pressure of spring 66 is overcome, and the pawl 45 is thrown into engagement with pawl 74, so that the wheel 30, on which the pawl 45 is mounted, is rotated so long as the teeth, extending around a part of its circumference, are in engagement with pinion 32.

An arm 70 Figs. 3 and 5 pivotally mounted in a bracket 71, is provided with a flattened end 72, and said arm is slotted as shown at 73, the pawl 74 being mounted in the slot and arm 70 and pawl 74 being under the control of a spring 75. This pawl 74 normally engages the stop 60 on the end of the yoke shaped pawl 45 holding the latter out of engagement with ratchet wheel 44 and preventing rotation of the wheel 30.

Pawl 74 is engaged by cam element 57 on shaft 56 previously referred to, the cam actuating the pawl or trip 74 to release the pawl 45 to enable the latter to engage the ratchet 44, and thereby bring about rotation of the wheel 30 with the shaft 27.

The first revolution of wheel 30 throws the sheaf carrier into discharge position, and the second engagement of the teeth of gear or wheel 30 with the gear or pinion 32 causes the rotation of said pinion sufficiently to return the sheaf carrier to operative position through the medium of the reciprocating bar 36 and the crank arm 34.

The cam 33' holds arm 70 in position for retaining the pawl 74 inactive until after the gear wheel 30 has engaged the pinion 32 a second time, as the result of one operation of the pedal, permitting the return of the sheaf carrier to normal position upon the continued forward movement of the machine and the resulting continued drive through the main shaft and gearing described.

A bracket 80 is mounted on the frame and is provided with a finger 81 extending adjacent to one side of gear wheel 30 and constituting a guiding element. A spring held pawl 82 is mounted on this bracket and is retained by the spring in contact with the opposite side of the gear wheel 30.

Shaft 33 also carries a wheel 85 provided with a single tooth, the latter being engaged by pawl 86 under the influence of spring 87, the pawl being in engagement with the abrupt face of the tooth when the sheaf carrier is in normal position. The accidental rotation of shaft 33 during the forward movement of the machine is therefore prevented.

The sheaf carrier can not be damaged by engagement with obstacles, because it is held in discharge position so long as pedal 48 is held down.

It will be gathered from the foregoing that when the pedal 48 is depressed, the sheaf carrier will be retained in the downwardly extending position. It will also be gathered that when it is desired to actuate the sheaf carrier through the medium of the mechanism best shown in Figs. 3 to 5, the pedal 48 is depressed and is then released so as to permit of the raising of the sheaf carrier by the improved mechanism.

By virtue of the driver's ability to maintain the sheaf carrier in downwardly extending position, the carrier may be made to clear trees and stumps, and in that way breakage of or injury to the carrier may be averted.

Manifestly when the pedal 48 is released and is returned by the spring 50 to its normal position, the gear 30 will be returned to the position shown in Fig. 3 so as to raise the sheaf carrier, whereupon by the coöperation of the pawl 74 with the stop 60, and the coöperation of the pawl 86 with the abutment or tooth on the wheel 85, the sheaf carrier will be maintained in raised position until the pedal 48 is depressed.

With a view to enabling the driver to maintain the sheaf carrier in downwardly extending position by continued pressure on the pedal 48, I provide the pawl 74 at its heel with an upwardly extending projection 90, and I shape the cam element 57 as illustrated, so that upon rocking of the shaft 56 through the medium of the pedal 48, the cam element 57 by acting against the major portion of the pawl 74, will first depress the said major portion, and then by acting against the projection 90 will raise said major portion of the pawl 74, thereby enabling the pawl 74 to disengage pawl 45 from the ratchet 44 after the sheaf carrier has been thrown downwardly and before the gear 30 has turned sufficiently to bring about the restoration of the sheaf carrier to its raised position.

What is claimed is:

1. The combination with the driving mechanism of a binder, of a sheaf carrier mounted to be thrown to discharge and carrying positions, a shaft and means connected therewith for controlling the sheaf carrier, a gear on said shaft, a second shaft, a segmental gear engaging the first-named gear, and loosely mounted on the second shaft, a pawl mounted on the segmental gear, a ratchet wheel rigidly mounted on the second shaft, means tending to hold the pawl in engagement with the ratchet wheel, a pivoted arm, a pawl movable thereby, means for controlling the pivoted arm, said second-named pawl being adapted for engagement with one end of the pawl on the gear for throwing said pawl into engagement with the ratchet wheel and producing rotation of the segmental gear through the medium of the second shaft, and manually controlled means for moving the second-named pawl out of and into the path of the first-named pawl.

2. The combination with the driving mechanism of a binder, of a sheaf carrier mounted to be thrown to discharge and carrying positions, a shaft equipped with a gear, a second shaft continuously rotated by said driving mechanism, a segmental gear loose on the second shaft and arranged to engage the first-named gear, a pawl carried by the segmental gear, a ratchet wheel fast on the second shaft to be engaged by said pawl, a pivoted spring-pressed arm, a pawl movable by said arm to position to engage the pawl on the segmental gear and bring about disengagement of said pawl from the ratchet wheel, a cam fast on the first shaft to move the pivoted arm away from the segmental gear, a wheel provided with a single tooth fast on said first shaft, a pawl to engage the tooth of said wheel, and a manually-controlled cam element to move the second-named pawl into the path of the pawl on the segmental gear to hold said pawl out of engagement with the ratchet wheel.

3. The combination with the driving mechanism of a binder, of a sheaf carrier mounted to be thrown to discharge and carrying positions, a shaft equipped with a gear, a second shaft continuously rotated by said driving mechanism, a segmental gear loose on the second shaft and arranged to engage the first-named gear, a pawl carried by the segmental gear, a ratchet wheel fast on the second shaft to be engaged by said pawl, a pivoted spring-pressed arm, a pawl movable by said arm to position to engage the pawl on the segmental gear and bring about disengagement of said pawl from the ratchet wheel, a cam fast on the first shaft to move the pivoted arm away from the segmental gear, a wheel provided with a single tooth fast on said first shaft, a pawl to engage the tooth of said wheel, and manually-operable means to move the second-named pawl into the path of the pawl on the segmental gear to hold said pawl out of engagement with the ratchet wheel.

4. The combination with the driving mechanism of a binder, of a sheaf carrier mounted to be thrown to discharge and carrying positions, a shaft equipped with a gear, a second shaft continuously rotated by said driving mechanism, a segmental gear loose on the second shaft and arranged to engage the first-named gear, a pawl carried by the segmental gear, a ratchet wheel fast on the second shaft to be engaged by said pawl, a pivoted spring-pressed arm, a pawl movable by said arm to position to engage the pawl on the segmental gear and bring about disengagement of said pawl from the ratchet wheel, means to move the pivoted arm on turning of the first shaft, means to prevent retrograde rotation of said first shaft, and manually-operable means to move the second-named pawl into the path of the pawl on the segmental gear to hold said pawl out of engagement with the ratchet wheel.

5. In means for the purpose described, the combination of a shaft, a ratchet wheel fast thereon, a wheel loose on the shaft, a pawl carried by said loose wheel and tending to engage said ratchet wheel, a pawl to engage the first pawl and hold the same out of engagement with said ratchet wheel, and manually-operable means to move the second pawl in opposite directions.

6. The combination with the driving mechanism of a binder, of a sheaf carrier mounted to be thrown to discharge and carrying positions, a reciprocable bar controlling the sheaf carrier, a shaft and means connected therewith for controlling the bar, a gear carried by the shaft, a segmental gear engaging the first-named gear, means for throwing the segmental gear into action from the driving mechanism and including pedal operated control mechanism, the segmental gear actuating the first-named gear for producing the discharge and return movements of the sheaf carrier upon depression and release of the pedal, and means including a pawl and an element to move the pawl in opposite directions whereby while the pedal is held in depressed position the sheaf carrier will be maintained in discharge position.

7. The combination of driving means, a sheaf carrier mounted for movement to discharge and carrying positions, means intermediate the driving means and the carrier whereby the carrier may be connected with and actuated by the driving means to be moved to discharge position and back to carrying position, and manual means including a pawl and an element to move the pawl in opposite directions whereby the connecting and actuating means may be controlled to temporarily retain the carrier in the discharge position.

In testimony whereof I affix my signature.

HERBERT W. MORROW.